April 7, 1936.　　　　　J. G. McMAHON　　　　　2,036,596
PIPE JOINT
Filed Nov. 23, 1934　　　　2 Sheets-Sheet 2
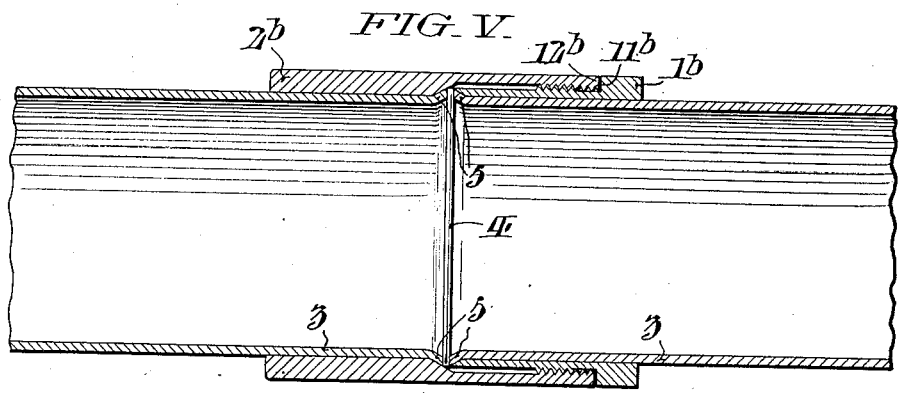
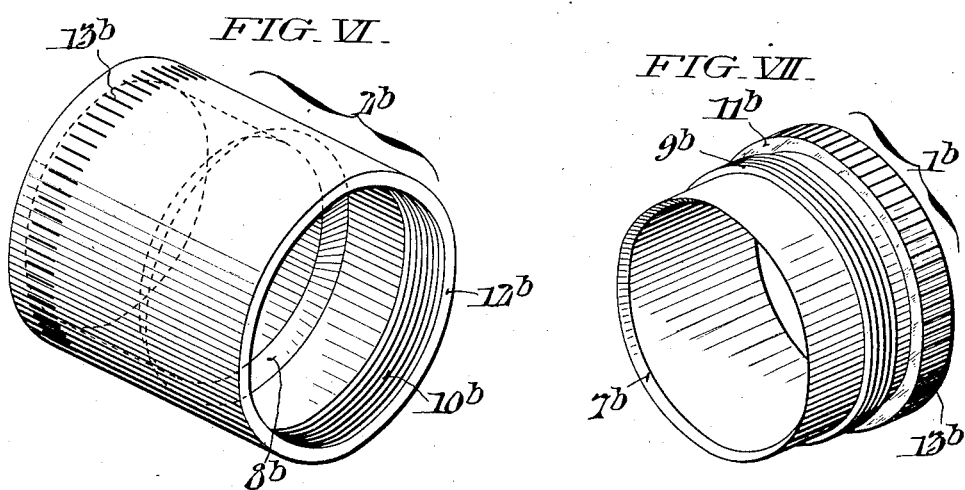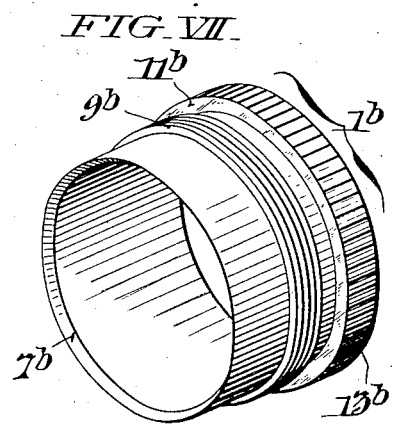
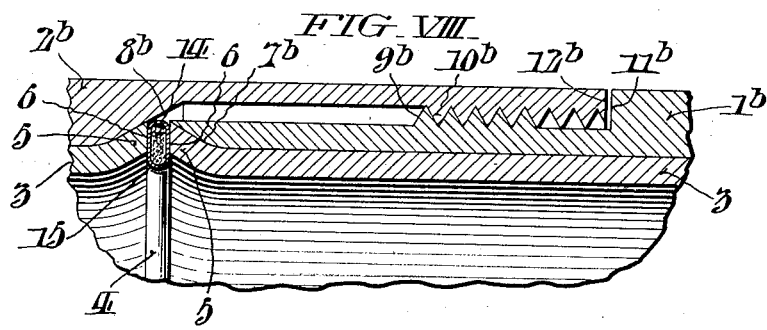
WITNESSES:　　　　　　　　　　　　　　　　INVENTOR:
　　　　　　　　　　　　　　　　　　　　John G. McMahon,
　　　　　　　　　　　　　　　　　BY
　　　　　　　　　　　　　　　　　　　　ATTORNEYS.

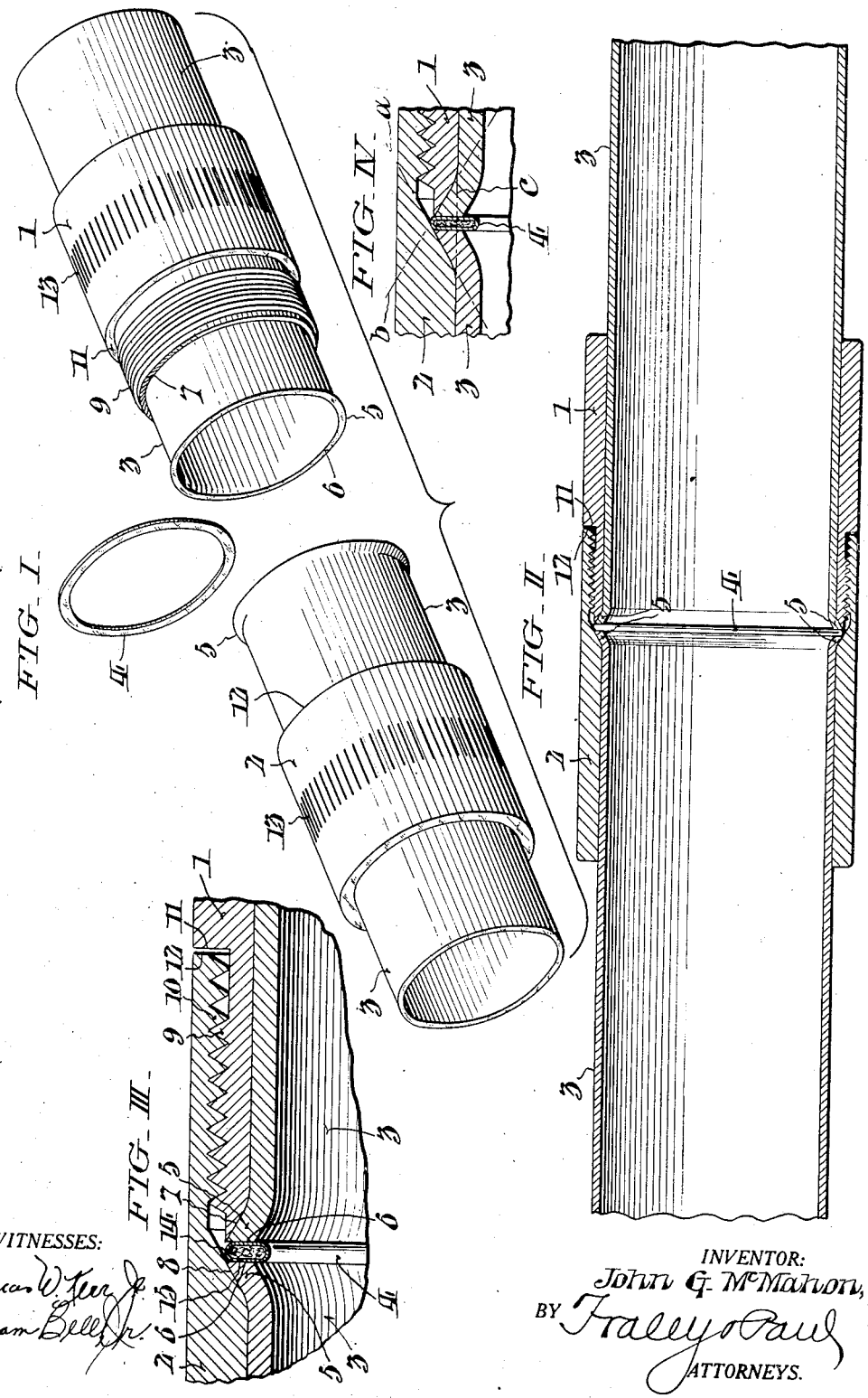

Patented Apr. 7, 1936

2,036,596

UNITED STATES PATENT OFFICE 2,036,596

PIPE JOINT

John G. McMahon, Philadelphia, Pa.

Application November 23, 1934, Serial No. 754,391

3 Claims. (Cl. 285—127)

My invention relates generally to pipe joints, and more particularly to the joining of thin wall tubing such as used to form conduits for electric wires or cables.

Heretofore many types of pipe joints have been proposed for connecting sections of tubing which make up a long conduit for electric wires, but so far as I am aware none are altogether satisfactory. In the first place, threaded unions cannot be used on the thin tubing of electrical conduits because the threading reduces the wall thickness to the breaking point. A thicker wall would be expensive and heavy, and when long distances are contemplated, this factor is of major importance. In the field of threadless pipe joints, some are too bulky and cumbersome and have outside sizes greatly in excess of the pipe, while others are too difficult to assemble or involve too many parts. A joint having inner projections which interfere with the free movement of wires within the pipe is obviously undesirable. Further, it is essential that the joint be made watertight, and this is of particular importance in a long conduit exposed to the weather.

The general object of my invention is the provision of a coupling which meets the peculiar needs of an electrical conduit, as outlined above. The novel features of my invention, however, have obvious applications to pipes and tubing generally.

A more specific object of the invention is the provision of light, simple and inexpensive means for making joints in thin walled electrical conduits, and this is accomplished by a coupling which requires no threading of the tubing, and which is nevertheless impervious to moisture and completely free of any inner projections which would decrease the effective inner diameter of the conduit. Another and related object is the provision of a joint which cannot be drawn tight without the inclusion of a gasket which is used to make the joint moisture proof.

A still further object is the provision of a joint which is strong, yet one which has a diameter not greatly in excess of the diameter of the pipe itself, so that separate conduits may be grouped closely together with obvious benefits.

Further objects and advantages of my invention will become more apparent from the description hereinafter of one embodiment or example thereof, the description having reference to the accompanying drawings. Of the drawings:

Fig. I represents a perspective view of the parts of my pipe joint in unassembled relation, showing the end portions of two pieces of tubing to be joined, each with its corresponding coupling sleeve in place, and showing also the gasket by which a moisture proof joint is accomplished.

Fig. II represents a longitudinal section of the joint when completely assembled.

Fig. III represents a partial longitudinal section of the joint when assembled showing in detail the relationship between the gasket, the terminal flanges of the pipe sections, and the coupling sleeves before tightening of the joint.

Fig. IV represents a partial longitudinal section of the joint showing the parts when the coupling sleeves are tightened to compress the washer.

Fig. V represents a longitudinal section of a modified form of joint embodying my invention.

Fig. VI represents a perspective view of the outer coupling sleeve used in the modified form of joint embodying my invention.

Fig. VII represents a perspective view of the inner coupling sleeve used in the modified form of my invention; and, Fig. VIII represents a partial longitudinal section of the modified form of joint showing in detail the relationship between the gasket, the terminal flanges of the tubing, and the inner and outer coupling sleeves before tightening of the joint.

The pipe joint of my invention shown in Figs. I to IV of the drawings comprise generally, coupling sleeves 1, 2, which are adapted to fit over the end portions of pipe sections 3, and a washer 4. An inclined flange 5 is formed at the end of each pipe section 3. The flanges 5 are faced perpendicularly to the longitudinal axis of the pipe sections, so that their end faces 6 are adapted to bear upon the sides of the washer 4.

The coupling sleeves 1, 2 are designed with an inside diameter which gives a very close fit upon the outer surface of the tube to be coupled. Each coupling sleeve 1, 2 is formed with an inclined shoulder 7, 8 which conforms to the inclination of the terminal flanges 5 of the pipe sections 3. The coupling sleeves 1, 2 are scarfed in such manner that when fitted together they form a cylinder of uniform outside diameter and of a uniform inside diameter, except for the region where the inclined shoulders 7, 8 occur. On the sleeve 1 which is exteriorly threaded, as indicated at 9, the shoulder 7 is formed at the extreme end. On the coupling sleeve 2 which is interiorly threaded, as indicated at 10, the inclined shoulder 8 is formed near the base of the thread. A stop shoulder 11 is formed on the sleeve 1 carrying the male threads, and this shoulder affords a meeting edge which is designed to contact with the exposed edge 12 at the end of the sleeve 2, so that when the coupling sleeves are joined together the cylinder thus formed has a substantially smooth outer surface. Moreover, the parts are so designed that when the end 12 of the coupling sleeve 2 engages the stop shoulder 11 on the coupling sleeve 1, there is a gap between the perpendicularly faced ends 6 of the adjoining pipe sections 3. Thus the coupling is specially designed to prevent assembly of the parts without inclusion of the gasket 4, for when the gasket is inadvertently omitted, the operator cannot tighten the joint, and his attention is therefore immediately called to the fact that he has failed to insert the washer. Preferably the coupling sleeves are knurled as indicated at 13 in order to facilitate the gripping of the sleeves by a wrench in assembling the coupling.

The inclined flanges 5 at the ends of the pipe sections 3 are conveniently formed by rolling with a mandrel or the like which is inserted interiorly of the pipe ends, and by the use of a die surrounding the pipe ends which determines the shape of the flanges. In the illustrated example of the invention, the flanges 5 are inclined to an angle of approximately 30°, and the shoulders 7, 8 on the coupling sleeves 1, 2 are similarly inclined. It will be noted that the flanges 5 are faced in a plane perpendicular to the longitudinal axis of the tubing, as indicated at 6, in order to provide effective contact surfaces for engaging the washer 4. The formation of the inclined shoulders 7, 8 and the flaring of the ends of the pipe sections 3 in the manner shown is particularly advantageous. As the coupling sleeves 1, 2 are drawn into threaded engagement, there is produced a resultant force which tends to bend the flanges 5 inwardly and hence to force the end faces 6 into more intimate contact with the sides of the washer, compressing the washer and forming a tight seal. This produces an improved joint as compared with joints for thin wall tubing in which flanges are formed on the adjacent sections at right angles to the axis of the tubing.

In Fig. III the parts are shown in the positions occupied before the washer 4 is compressed. When the coupling sleeves 1, 2 are screwed together to the limit of their engagement, the washer is compressed and the parts assume the positions shown in Fig. IV. It will be noted that when the joint is tightened the shoulders 7, 8 provide an annular groove of substantially triangular cross section, the sides of the triangle being designated by the letters a, b, and c, and that the washer 4 is squeezed into the apex of the triangle, incident to tightening of the joint, forming an effective seal between the coupling sleeves, as well as forcing the flanges 5 into intimate engagement with the sides of the washer 4. Furthermore, the washer being initially of a larger inside and outside diameter than that of the pipe sections 3, when it is fully compressed it does not project interiorly beyond the inner surface of the pipe sections, and hence it does not impair the free movement of wires through the conduit. It is clear that as the washer 4 is compressed between the end faces 6 of the pipe sections 3, full contact is maintained between the sides of the washer and the end faces 6, and yet the washer is not distorted so as to restrict the cross sectional area of the conduit. The washer 4 may take a variety of forms, but in the present example it comprises a body 14 of yielding material surrounded by a metal covering 15.

In assembling the pipe joint of this invention, the coupling sleeves 1, 2 are placed upon the pipe sections 3, the gasket 4 is introduced into the coupling sleeve 2, and the sleeves are brought into threaded engagement, and screwed together to the limit of their engagement. When the coupling sleeves are thus joined, it will be apparent to the workman that the gasket 4 has been pressed between the end faces 6 of the pipe sections; but if the gasket has been omitted by mistake, the pipe sections will turn freely on the coupling and will have capacity for slight longitudinal movement. This will serve as a warning that the gasket has been omitted.

In Figs. V to VIII, a modified form of pipe joint embodying my invention is illustrated. In this form the pipe sections 3 and the gasket 4 are formed in the same manner as described above, but the coupling sleeves 1b, 2b are of somewhat different construction. More specifically, the stop shoulder 11b on the coupling sleeve 1b is formed at a greater distance from the center of the joint so that there is a longer region of overlap between the two elements. This has the advantage of shortening the length of the coupling and at the same time providing layers of overlapping metal which extend over a considerable distance longitudinally of the joint.

I have found that my invention provides a very effective coupling for tubing having comparatively thin walls, and is particularly adapted for use with electrical conduits. The joint formed is moisture proof and the terminal portions of the tubing are not weakened by threading. It is incapable of a tight assembly without the inclusion of the necessary gasket. The outside diameter of the coupling is only slightly greater than that of the tubing, thus facilitating nesting of a number of conduits, as well as presenting a smooth and pleasing appearance. Its component parts are simple and inexpensive, and the assembly and the breaking down of the coupling constitute very simple operations.

While my invention has been described in some detail with reference to two specific embodiments thereof, various changes in the form of the apparatus used are within the contemplation of the invention, and such changes should not be deemed to constitute a departure from the spirit of the invention as hereinafter claimed.

Having thus described my invention, I claim:

1. A pipe joint, comprising aligned pipe sections, each having an outwardly inclined flange with the end thereof faced perpendicularly to the longitudinal axis of the pipe section, a coupling sleeve surrounding and closely fitting the end portion of each pipe section, said sleeves being in threaded engagement with each other and having inclined shoulders engaging said flanges, and a gasket interposed between the end faces of the pipe sections, the outer edge of said gasket being confined against said inclined shoulders when said sleeves are tightly coupled.

2. A pipe joint according to claim 1 which is characterized by the further fact that when said coupling sleeves are assembled the inclined shoulders define an annular groove of substantially triangular cross section with the washer filling the apex of said triangle.

3. A pipe joint comprising aligned pipe sections, each having an outwardly inclined flange with the end thereof faced perpendicularly to the longitudinal axis of the pipe section, a coupling sleeve surrounding and closely fitting the end portion of each pipe section, said sleeves being in threaded engagement with each other and having scarfed abutting surfaces, and said sleeves having inclined shoulders engaging said flanges, and a gasket interposed between the end faces of the pipe sections, the coupling sleeves and pipe sections being so designed that when the sleeves are screwed together to the limit of their engagement the outer edge of said gasket is confined against said inclined shoulders and the end faces of said pipe sections are spaced apart.

JOHN G. McMAHON.